US010797623B2

(12) United States Patent
Watanabe

(10) Patent No.: US 10,797,623 B2
(45) Date of Patent: Oct. 6, 2020

(54) SEMICONDUCTOR DEVICE AND METHOD OF DETECTING ITS ROTATION ABNORMALITY

(71) Applicant: RENESAS ELECTRONICS CORPORATION, Tokyo (JP)

(72) Inventor: Hisaaki Watanabe, Tokyo (JP)

(73) Assignee: RENESAS ELECTRONICS CORPORATION, Tokyo (JP)

(*) Notice: Subject to any disclaimer, the term of this patent is extended or adjusted under 35 U.S.C. 154(b) by 0 days.

(21) Appl. No.: 16/176,354

(22) Filed: Oct. 31, 2018

(65) Prior Publication Data

US 2019/0199251 A1    Jun. 27, 2019

(30) Foreign Application Priority Data

Dec. 21, 2017  (JP) .................... 2017-244728

(51) Int. Cl.
| | |
|---|---|
| *H02P 6/16* | (2016.01) |
| *G01D 3/08* | (2006.01) |
| *G01D 5/244* | (2006.01) |
| *G01D 5/14* | (2006.01) |
| *G01M 1/22* | (2006.01) |

(52) U.S. Cl.
CPC ............ *H02P 6/16* (2013.01); *G01D 3/08* (2013.01); *G01D 5/14* (2013.01); *G01D 5/24466* (2013.01); *G01M 1/22* (2013.01)

(58) Field of Classification Search
CPC .................................... H02P 6/16; G01D 5/14
USPC .................................................. 318/400.37
See application file for complete search history.

(56) References Cited

U.S. PATENT DOCUMENTS

| | | | |
|---|---|---|---|
| 5,691,611 | A | 11/1997 | Kojima et al. |
| 7,603,250 | B2 | 10/2009 | Nishimoto et al. |
| 2006/0288800 | A1 | 12/2006 | Mukai et al. |

(Continued)

FOREIGN PATENT DOCUMENTS

| | | |
|---|---|---|
| JP | 2015-119525 A | 6/2015 |
| WO | 2015/093381 A1 | 6/2015 |

OTHER PUBLICATIONS

Extended European Search Report issued in corresponding European Patent Application No. 18203806.7-1022, dated May 9, 2019.

*Primary Examiner* — Erick D Glass
(74) *Attorney, Agent, or Firm* — McDermott Will & Emery LLP

(57) ABSTRACT

The conventional semiconductor device requires use of a separate vibration sensor or the like to detect a rotation abnormality of a motor. According to an embodiment, a semiconductor device includes: a resolver rotation angle conversion circuit that obtains a rotation angle signal indicative of a rotation angle of the motor obtained from a resolver that measures the rotation angle of the motor and generates rotation angle information by converting the rotation angle signal to a digital value; a motor rotation angle conversion circuit that generates rotation angle temporal change information by converting the rotation angle information with respect to each phase of the motor to an angular change of the motor; and a determination circuit that determines that an abnormality occurs in the motor in a case of exceeding a fluctuation abnormality detection range of the rotation angle temporal change in the rotation angle temporal change information.

4 Claims, 12 Drawing Sheets

(56) References Cited

U.S. PATENT DOCUMENTS

| | | | |
|---|---|---|---|
| 2009/0079373 A1* | 3/2009 | Nagase | H02P 29/027 318/400.22 |
| 2012/0013281 A1* | 1/2012 | Watanabe | B60L 15/2045 318/400.04 |
| 2014/0172359 A1 | 6/2014 | Komatsu | |
| 2015/0270796 A1* | 9/2015 | Watanabe | B60L 15/007 318/400.05 |

* cited by examiner

SEMICONDUCTOR DEVICE AND METHOD OF DETECTING ITS ROTATION ABNORMALITY

CROSS-REFERENCE TO RELATED APPLICATIONS

The disclosure of Japanese Patent Application No. 2017-244728 filed on Dec. 21, 2017 including the specification, drawings and abstract is incorporated herein by reference in its entirety.

BACKGROUND

The present invention relates to a semiconductor device and a method of detecting its rotation abnormality, such as a semiconductor device that controls a motor and a method of detecting a rotation abnormality of the motor in association with the semiconductor.

Recently, rotation of a motor is optimally controlled by generating a drive waveform for controlling the rotation of the motor using an arithmetic unit (e.g. MCU (Micro Controller Unit)) capable of executing a program and by obtaining a rotating state of the motor. Here, the motor is a rotting equipment, to which vibration can be applied due to a failure. The vibration of the motor may possibly lead to a subsequent large failure, and so it is important to detect abnormal vibration of the motor in the context of safety design. Thus, Japanese Unexamined Patent Application Publication No. 2015-119525 discloses an example of a method of detecting abnormal vibration of a motor.

Japanese Unexamined Patent Application Publication No. 2015-119525 discloses an abnormality sensing device for an electric vehicle. The abnormality sensing device includes a motor-reducer unit including a motor that drives a wheel and a reducer that is integrated with the motor and decelerates the rotation of the motor to transfer to the wheel. The abnormality sensing device is also provided with an abnormality detection means that detects occurrence of an abnormality in the motor-reducer unit as well as whether the abnormality occurs in the motor or the reducer when a value in a specific frequency domain in vibration information measured by a vibration sensor exceeds a preset threshold.

SUMMARY

However, the technology described in Japanese Unexamined Patent Application Publication No. 2015-119525 involves a problem that the vibration sensor must be used to detect the occurrence of an abnormality in the motor-reducer unit.

Other problems and novel features will become apparent from the description of this application and appended drawings.

According to an embodiment, a semiconductor device includes: a resolver rotation angle conversion circuit that obtains a rotation angle signal indicative of a rotation angle of a motor from a resolver that measures the rotation angle of the motor and generates rotation angle information by converting the rotation angle signal to a digital value; a motor rotation angle conversion circuit that generates rotation angle temporal change information by converting the rotation angle with respect to each phase of the motor to an angular change of the motor; and a determination circuit that determines that an abnormality occurs in the motor in a case of exceeding a fluctuation abnormality detection range of the rotation angle temporal change in the rotation angle temporal change information.

According to the embodiment, it is possible to detect abnormal vibration of the motor without using an element for detecting vibration such as a vibration sensor.

DETAILED DESCRIPTION

Figure 1:
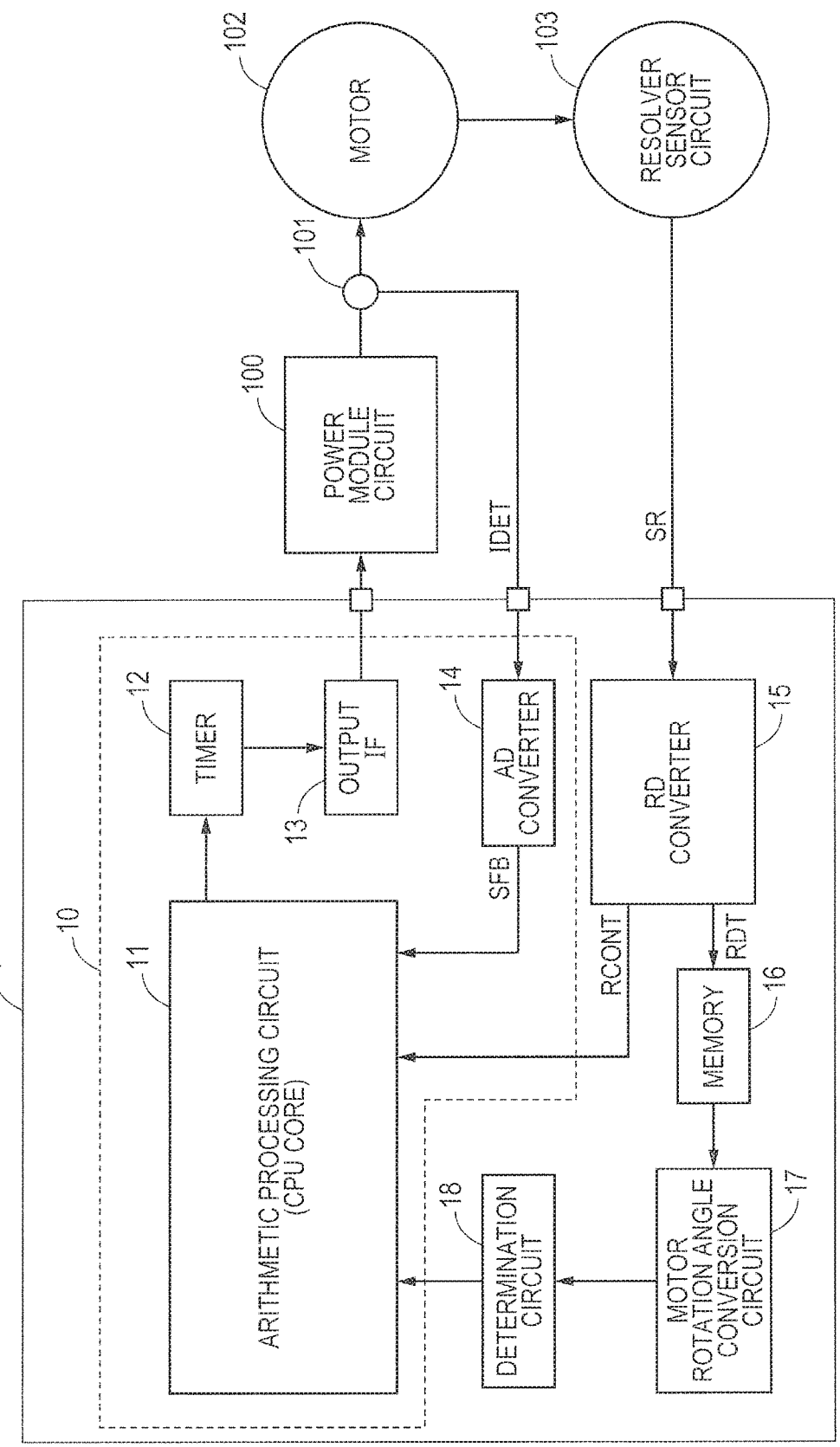
FIG. 1 is a block diagram of a semiconductor device according to a first embodiment.

For clear explanation, the following description and drawings may be omitted or simplified as appropriate. Moreover, each element illustrated in the drawings as a functional block that performs various processings can be configured by a CPU, a memory, or any other circuit as hardware, or can be implemented by a program loaded in the memory or the like as software. Thus, it is appreciated by those skilled in the art that these functional blocks can be achieved in various forms by only hardware, only software, or a combination thereof without limitation to any one of them. It is to be noted that like reference numerals designate like parts throughout the drawings and repeated description thereof is omitted as appropriate.

The above-mentioned program can be stored in various types of non-transitory computer readable media (non-transitory computer readable medium) and supplied to a computer. The non-transitory computer readable media include various types of tangible storage media (tangible storage medium). Examples of the non-transitory computer readable medium include a magnetic recording medium (e.g., flexible disk, magnetic tape, hard drive), a magneto-optical recording medium (e.g., magneto-optical disk), a CD-ROM (Read Only Memory), a CD-R, a CD-R/W, and a semiconductor memory (e.g., mask ROM, PROM (Programmable ROM), EPROM (Erasable PROM), flash ROM, RAM (Random Access Memory)). The program may be supplied to the computer by various types of transitory computer readable media (transitory computer readable medium). Examples of the transitory computer readable medium include an electric signal, an optical signal, and an electromagnetic wave. The transitory computer readable medium can supply the program to the computer via a wired communication path such as an electric wire and an optical fiber or a wireless communication path.

[First Embodiment]

FIG. 1 shows a block diagram of a semiconductor device 1 according to a first embodiment. In addition to the semiconductor device 1, FIG. 1 shows a motor 102 to be controlled by the semiconductor device 1. FIG. 1 also shows a power module circuit 100, a current sensor 101, and a resolver (e.g. resolver sensor circuit 103) as external components of the semiconductor device 1 required for controlling the motor 102.

The semiconductor device 1 outputs a drive waveform signal used as a signal waveform of a drive signal that drives the motor 102. The drive waveform signal is amplified by the power module circuit 100 to be made into the drive signal, and the motor 102 is rotated by the drive signal output from the power module circuit 100. The current sensor 101 measures a magnitude of drive current provided as the drive signal that drives the motor 102, and outputs a current detection signal IDET. The resolver sensor circuit 103 measures a rotation angle of the resolver sensor circuit 103 and outputs a rotation angle signal SR indicative of the rotation angle of the motor. The semiconductor device 1 controls the rotating number of the motor 102 by changing the waveform of the drive waveform signal based on the current detection signal IDET and the rotation angle signal SR.

In the first embodiment, the rotation abnormality of the motor 102 is detected on the basis of the rotation angle signal SR while controlling the motor as described above. Now, the first embodiment is described in detail below. As shown in FIG. 1, the semiconductor device 1 according to the first embodiment includes a motor drive control circuit 10, a resolver rotation angle conversion circuit (e.g. RD converter 15), a memory 16, a motor rotation angle conversion circuit 17, and a determination circuit 18. It is to be noted that the RD converter 15 is also used for motor control by the motor drive control circuit 10. Moreover, the motor drive control circuit 10 includes an arithmetic processing circuit 11, a timer 12, an output interface circuit 13, and an AD converter 14

The motor drive control circuit 10 generates a drive waveform signal indicative of the drive signal that drives the motor 102. The drive waveform signal is generated by the arithmetic processing circuit 11, the timer 12, and the output interface circuit 13. The arithmetic processing circuit 11 executes a program for controlling the motor 102. The program may be stored in the memory 16 or may be stored in another memory that is not shown. The arithmetic processing circuit 11 loads the program from the memory and executes the same.

The timer 12 generates a PWM (Pulse Width Modulation) signal to be the drive waveform signal based on an instruction from the arithmetic processing circuit 11. The output interface circuit 13 outputs the PWM signal generated by the timer 12 to the power module circuit 100 as the drive waveform signal. The AD converter 14 outputs a digital value of the size corresponding to the voltage level of the current detection signal IDET given as an analog signal. The signal output from the AD converter 14 is provided to the arithmetic processing circuit 11 as a feedback signal SFB.

The RD converter 15 obtains the rotation angle signal SR (analog signal) indicative of the rotation angle of the motor 102 and converts the rotation angle signal SR to the digital value, thereby generating rotation angle information. In the example shown in FIG. 1, the RD converter 15 outputs rotation angle information for control RCONT and rotation angle information for abnormality detection RDT as rotation angle information. The rotation angle information for control RCONT is provided to the arithmetic processing circuit 11 to be used for controlling rotation of the motor. The rotation angle information for abnormality detection RDT is once stored in the memory 16. It is to be noted that, although the RD converter 15 is incorporated in the semiconductor device 1 in the example shown in FIG. 1, the RD converter 15 may be formed over a semiconductor chip different from the semiconductor device 1.

The motor rotation angle conversion circuit 17 generates rotation angle temporal change information by converting the rotation angle with respect to each phase of the motor to the angular change of the motor 102. In the motor rotation angle conversion circuit 1 according to the first embodiment, the motor rotation angle conversion circuit 17 generates the rotation angle temporal change information so that each piece of the rotation angle temporal change information includes the rotation angle information for at least one revolution of the motor 102.

The determination circuit 18 determines that an abnormality has occurred when the rotation angle temporal change in the rotation angle temporal change information exceeds an abnormality detection range. The determination circuit 18 provides the arithmetic processing circuit 11 with information about whether an abnormality occurred to the motor 102. The arithmetic processing circuit 11 either suppresses the rotating number of or stops the motor 102 when the information provided by the determination circuit 18 indicates an abnormality of the motor drive control circuit 10. A method of determining the abnormality by the determination circuit 18 will be described later.

Figure 2:
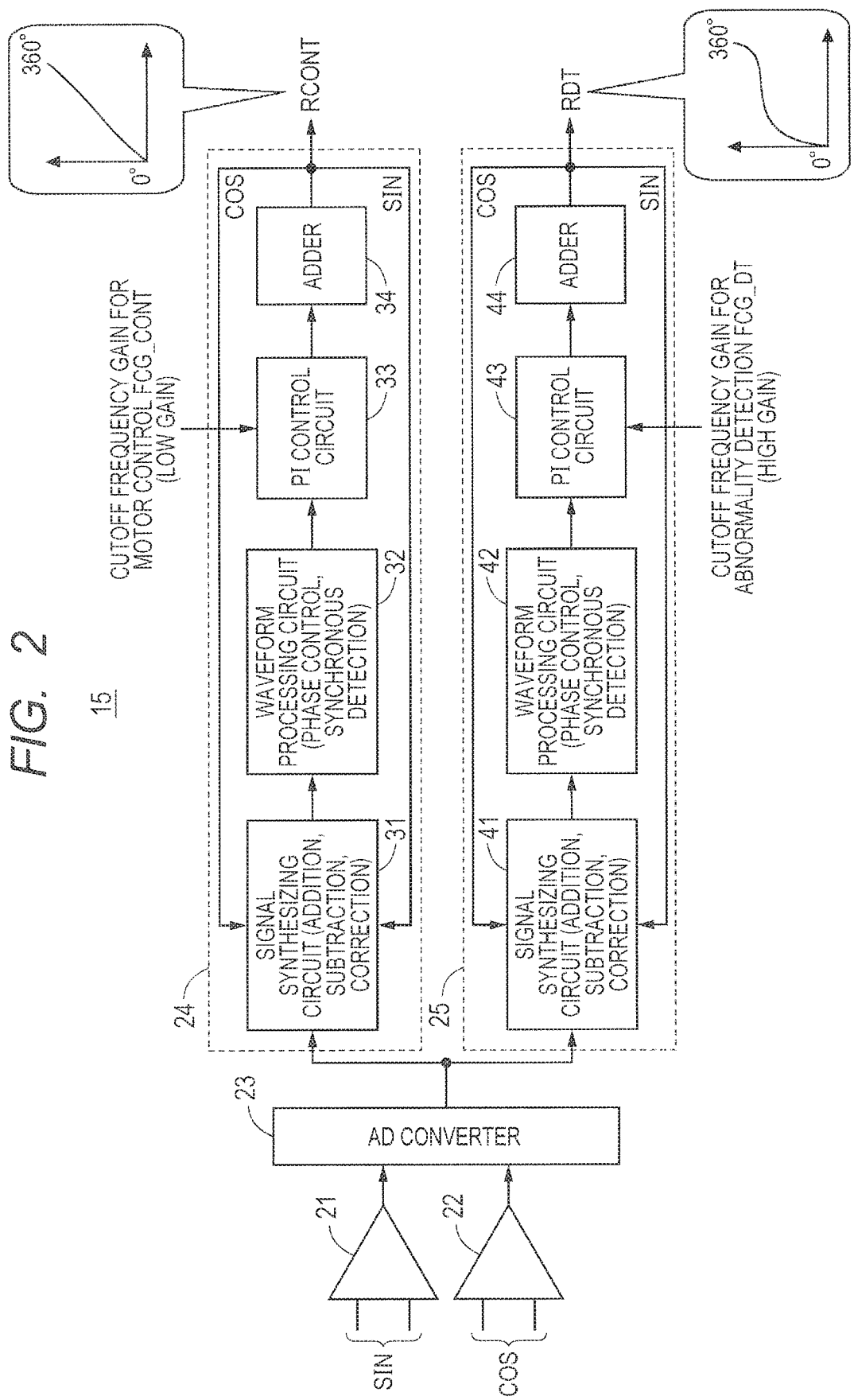
FIG. 2 is a s block diagram of an RD converter of the semiconductor device according to the first embodiment.

Now, the RD converter 15 according to the first embodiment is described in detail. FIG. 2 shows a block diagram of the RD converter 15 according to the first embodiment. As shown in FIG. 2, the RD converter 15 according to the first embodiment includes input buffers 21, 22, an AD converter 23, a first tracking loop circuit 24, and a second tracking loop circuit 25.

The input buffer 21 receives a SIN component of the rotation angle signal SR as a differential signal, and outputs the rotation angle signal SR of the SIN component as a single-ended signal. The input buffer 22 receives a COS component of the rotation angle signal SR as the differential signal, and outputs the rotation angle signal SR of the COS component as the single-ended signal.

The AD converter 23 converts signals output from the input buffers 21, 22 to digital values, and outputs them to the first tracking loop circuit 24 and the second tracking loop circuit 25 in the subsequent stage. The first tracking loop circuit 24 generates the rotation angle information for control RCONT from the digital value output by the AD converter 23 using a first filter coefficient (e.g. cutoff frequency gain for motor control FCG_CONT) having low trackability to the rotation angle signal SR. The rotation angle information for control RCONT is output to the motor drive control circuit 10. The second tracking loop circuit 25 generates the rotation angle information for abnormality detection RDT from the digital value output by the AD converter 23 using a second filter coefficient (e.g. cutoff frequency gain for abnormality detection FCG_DT) having high trackability to the rotation angle signal SR. The rotation angle information for abnormality detection RDT is output to the motor rotation angle conversion circuit 17 via the memory 16.

Here, the rotation angle information for control RCONT and the rotation angle information for abnormality detection RDT are described. The rotation angle information for control RCONT is filtered by the first filter coefficient having a gain lower than that of the rotation angle information for abnormality detection RDT. Thus, as shown in FIG. 2, the rotation angle information for control RCONT exhibits less fluctuation of the waveform compared to the rotation angle information for abnormality detection RDT. That is, the rotation angle information for control RCONT indicates time transition of the rotation angle having less noise component and more suitable for locating the rotational position of the motor 102. On the other hand, the rotation angle information for abnormality detection RDT better reflects change of the rotation angle of the motor 102 having higher trackability to the rotation angle signal SR and detected by the resolver sensor circuit 103.

Thus, with the semiconductor device 1 according to the first embodiment, the motor drive control circuit 10 is provided with the rotation angle information for control RCONT indicative of the temporal change of the rotation angle closer to its ideal state having less noise component. This allows the semiconductor device according to the first embodiment to improve accuracy in controlling rotation of the motor. On the other hand, with the semiconductor device 1 according to the first embodiment, the motor rotation angle conversion circuit 17 is provided with the rotation angle information for abnormality detection RDT indicative of the temporal change of the rotation angle that reflects the fluctuation of the rotation angle. This can allow the semiconductor device 1 according to the first embodiment to improve accuracy in detecting vibration of the motor 102.

Here, the first tracking loop circuit 24 and the second tracking loop circuit 25 are described in further detail. As shown in FIG. 2, the first tracking loop circuit 24 includes a signal synthesizing circuit 31, a waveform processing circuit 32, a PI control circuit 33, and an adder 34. The second tracking loop circuit 25 includes a signal synthesizing circuit 41, a waveform processing circuit 42, a PI control circuit 43, and an adder 44. The first tracking loop circuit 24 and the second tracking loop circuit 25 are different from each other only in the cutoff frequency gain applied, and have the same circuit configuration. The configuration of the tracking loop circuit is now described taking the first tracking loop circuit 24 as an example.

The signal synthesizing circuit 31 generates a new SIN component and a new COS component by performing multiplication, division, and the like on the SIN component and the COS component of the rotation angle included in the rotation angle information for control RCONT to be output from the first tracking loop circuit 24 and the SIN component and the COS component of the rotation angle signal SR to be output from the AD converter 23. The waveform processing circuit 32 performs phase control and synchronous detection on the SIN component and the COS component synthesized by the signal synthesizing circuit 31. The PI control circuit 33 performs a proportional (Proportional) processing of weighting proportional to the cutoff frequency gain for motor control FCG_CONT and an integral (Integral) processing of integrating the weighted values on the SIN component and the COS component processed by the waveform processing circuit 32. The adder 34 generates the rotation angle information for control RCONT by adding the SIN component and the COS component processed by the PI control circuit 33. Moreover, the adder 34 outputs the SIN component and the COS component before the addition to the signal synthesizing circuit 31 as the feedback signal.

Consequently, processing performed by the motor rotation angle conversion circuit 17 according to the first embodiment is described. First, the resolver sensor circuit 103 outputs the rotation angle signal SR for one revolution in shorter time than the motor rotates one revolution. The motor rotation angle conversion circuit 17 then generates the rotation angle temporal change information by converting the rotation angle with respect to each phase of the motor to an angular change of the motor for one revolution. More specifically, the motor rotation angle conversion circuit 17 reads the rotation angle information for abnormality detection RDT corresponding to one revolution of the motor 102 from the rotation angle information for abnormality detection RDT stored in the memory 16, and synthesizes the read-out rotation angle information for abnormality detection RDT, thereby generating the rotation angle temporal change information. Now, FIG. 3 shows a diagram illustrating a process in the motor rotation angle conversion circuit of the semiconductor device according to the first embodiment.

Figure 3:
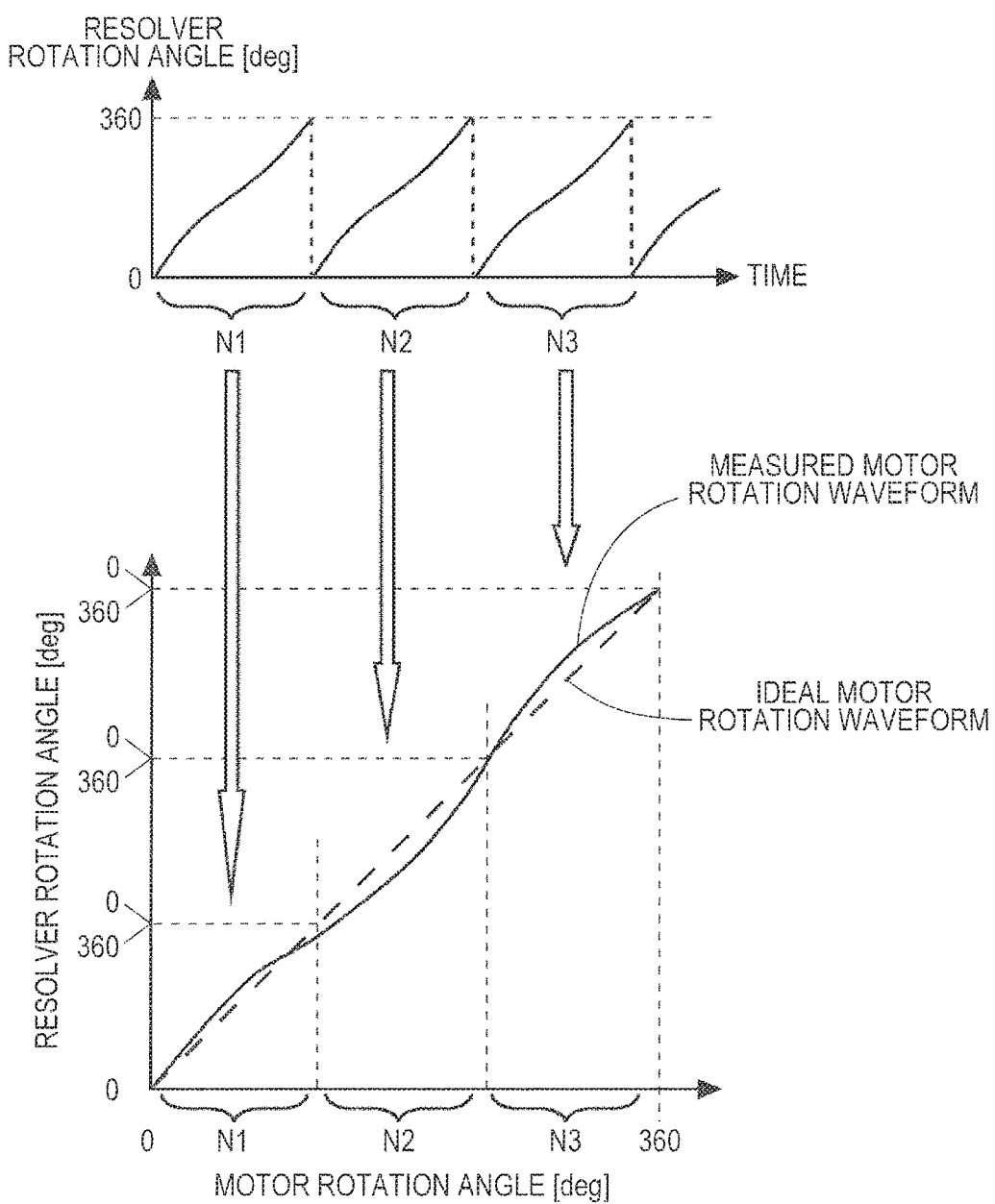
FIG. 3 is a diagram illustrating a process in a motor rotation angle conversion circuit of the semiconductor device according to the first embodiment.

FIG. 3 shows the rotation angle information for abnormality detection RDT generated from the rotation angle signal SR output by the resolver sensor circuit 103 in the upper part, and the rotation angle temporal change information after being processed by the motor rotation angle conversion circuit 17 in the lower part. The rotation angle information for abnormality detection RDT is expressed with a horizontal axis indicating time and a vertical axis indicating the resolver rotation angle. In the example shown in FIG. 3, three pieces of rotation angle information for abnormality detection RDT make the rotation angular change for one revolution of the motor 102. Thus, the motor rotation angle conversion circuit 17 synthesizes the three pieces of the rotation angle information for abnormality detection RDT to generate the rotation angle temporal change information for one revolution of the motor 102. Moreover, as shown in FIG. 3, the waveform of the rotation angle of the motor 102 generated on the basis of the rotation angle signal SR measured by the resolver sensor circuit 103 (e.g. rotation waveform) includes fluctuation with respect to an ideal motor rotation waveform.

Figure 4:
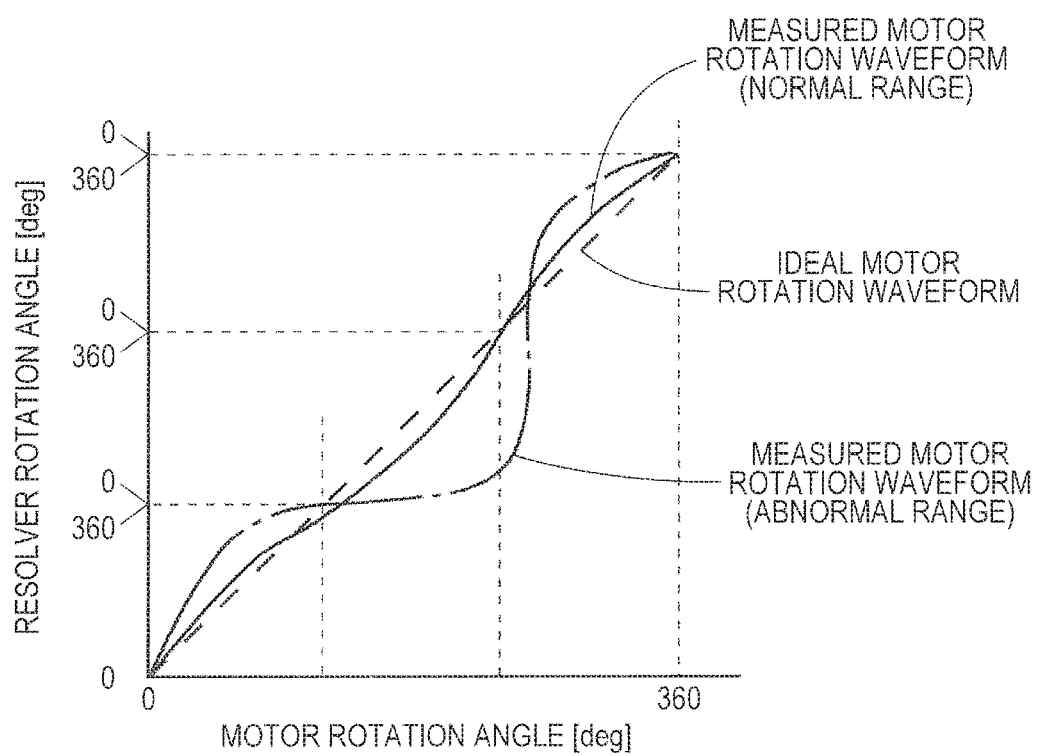
FIG. 4 is a diagram illustrating a temporal change of rotation angle temporal change information when a rotation abnormality occurs to be detected by the semiconductor device according to the first embodiment.

Determination of presence of a rotation abnormality in the motor 102 by the determination circuit 18 is described now. FIG. 4 shows a diagram illustrating the temporal change of the rotation angle temporal change information when the rotation abnormality occurs to be detected by the semiconductor device according to the first embodiment.

In a case where such a rotation abnormality as vibration is present in the motor 102, the rotating speed of the motor 102 becomes non-uniform. Therefore, the rotation angle temporal change information generated from the rotation angle signal SR output by the resolver sensor circuit 103 presents larger fluctuation with respect to the ideal motor rotation waveform compared to when there is no rotation abnormality. The determination circuit 18 determines that the rotation abnormality occurred to the motor 102 when a difference value between the ideal motor rotation waveform and the rotation angle temporal change information exceeds a preset abnormality detection range.

An example method of calculating the difference value between the ideal motor rotation waveform and the rotation angle temporal change information can include calculating a mean square and determining whether the mean square exceeds the abnormality detection range, thereby determining presence of the rotation abnormality. Another example method of calculating the difference value between the ideal motor rotation waveform and the rotation angle temporal change information can include setting the abnormality detection range having a preset range with respect to the ideal motor rotation waveform and detecting whether the value of the rotation angle temporal change information changes beyond the abnormality detection range.

From the above description, the semiconductor device 1 according to the first embodiment generates the rotation angle temporal change information for one revolution of the motor 102 from the rotation angle signal SR output by the resolver sensor circuit 103. The semiconductor device 1 according to the first embodiment then detects the rotation abnormality of the motor 102 in response to the fat that the difference value between the rotation angle temporal change information and the ideal motor rotation waveform exceeds the abnormality detection range. This allows the semiconductor device 1 according to the first embodiment to detect the rotation abnormality of the motor 102 without using a vibration sensor or the like.

The processings performed by the motor rotation angle conversion circuit 17 and the determination circuit 18 of the semiconductor device 1 according to the first embodiment are mainly based on numerical operation. Thus, these processings may be performed by a program executed by the arithmetic processing circuit 11.

Moreover, the semiconductor device 1 according to the first embodiment generates the rotation angle information for abnormality detection RDT having higher trackability to the rotation angle signal SR using the second filter coefficient having a higher filter gain than the rotation angle information for control RCONT used for controlling the motor in the motor drive control circuit 10, and detects the rotation abnormality using the rotation angle information for abnormality detection RDT. This allows the semiconductor device 1 according to the first embodiment to detect the rotation abnormality with high accuracy while appropriately controlling the motor by the motor drive control circuit 10.

Moreover, in the above description, the semiconductor device 1 according to the first embodiment determines the rotation abnormality of the motor 102 based on the rotation angle information for abnormality detection RDT for one revolution of the motor 102. In this manner, by determining the abnormality based on the rotation angle information for abnormality detection RDT for one or more revolutions of the motor 102, it is possible to detect the abnormality with high accuracy preventing erroneous detection of the rotation abnormality. It is to be noted that the length of the rotation angle information for abnormality detection RDT used for the abnormality detection may be shorter than one revolution of the motor 102. It is also possible to further improve accuracy in the abnormality detection by determining the rotation abnormality based on the rotation angle information for abnormality detection RDT for a longer period.

[Second Embodiment]

Figure 5:
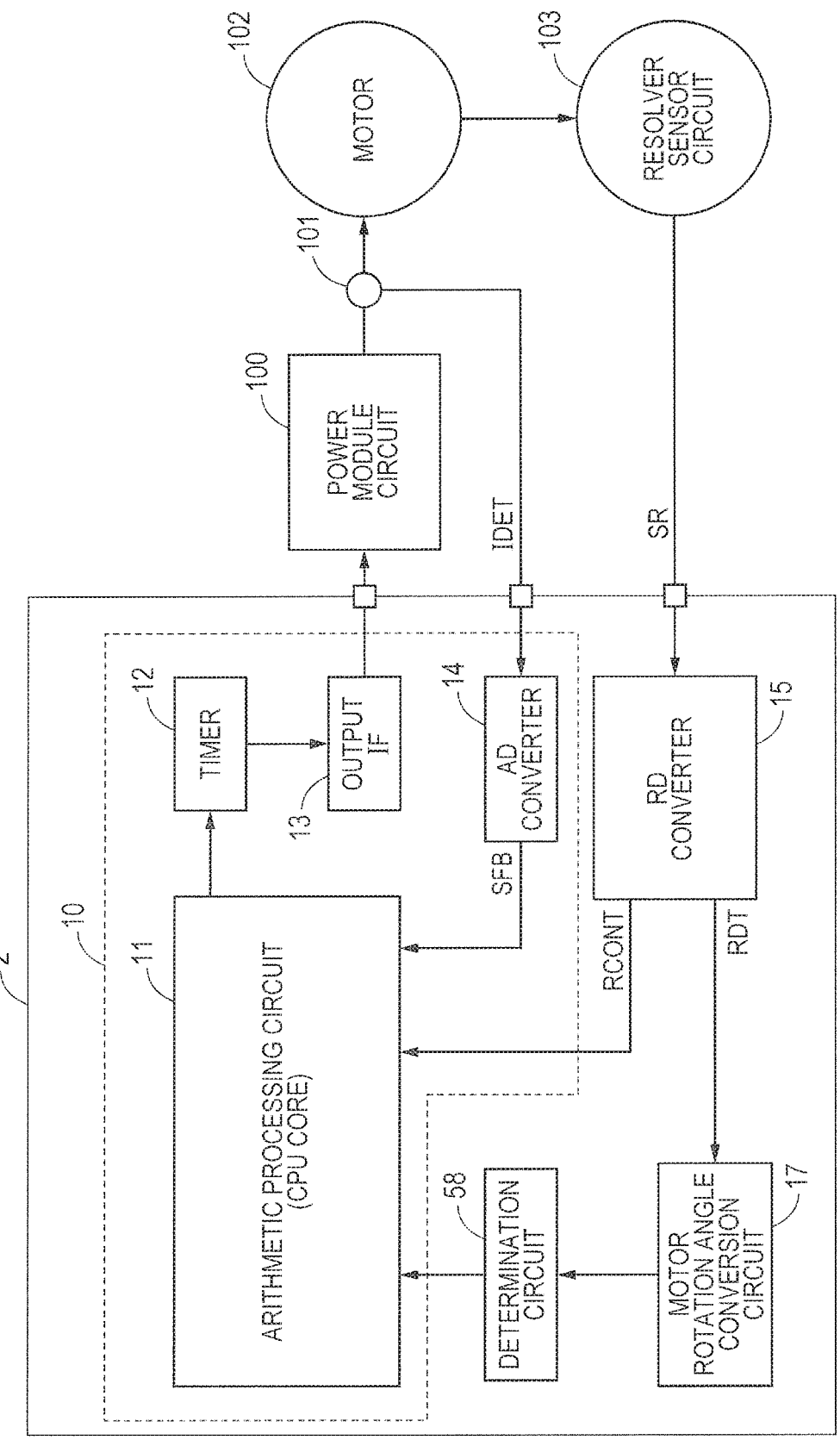
FIG. 5 is a block diagram of a semiconductor device according to a second embodiment.

In a second embodiment, a semiconductor device 2, which is another form of the semiconductor device 1 according to the first embodiment, is described. Now, FIG. 5 shows a block diagram of the semiconductor device 2 according to the second embodiment. As shown in FIG. 5, the semiconductor device 2 according to the second embodiment excludes the memory 16 from the semiconductor device 1 in the first embodiment, and includes a motor rotation angle conversion circuit 57 and a determination circuit 58 instead of the motor rotation angle conversion circuit 17 and the determination circuit 18.

The motor rotation angle conversion circuit 57 receives the rotation angle information for abnormality detection RDT directly from the RD converter 15 and outputs the rotation angle temporal change information in the receiving order. The determination circuit 58 includes a counter, determines whether the rotation angle temporal change information exceeds the abnormality determination range in the order of being received from the motor rotation angle conversion circuit 57, and counts up the value of the counter when the rotation angle temporal change information exceeds the abnormality determination range. Moreover, the determination circuit 58 changes the abnormality detection range according to rotating speed of the motor when the motor 102 is in an acceleration/deceleration state. The method of determining an abnormality by the determination circuit 58 is specifically described below.

Figure 6:
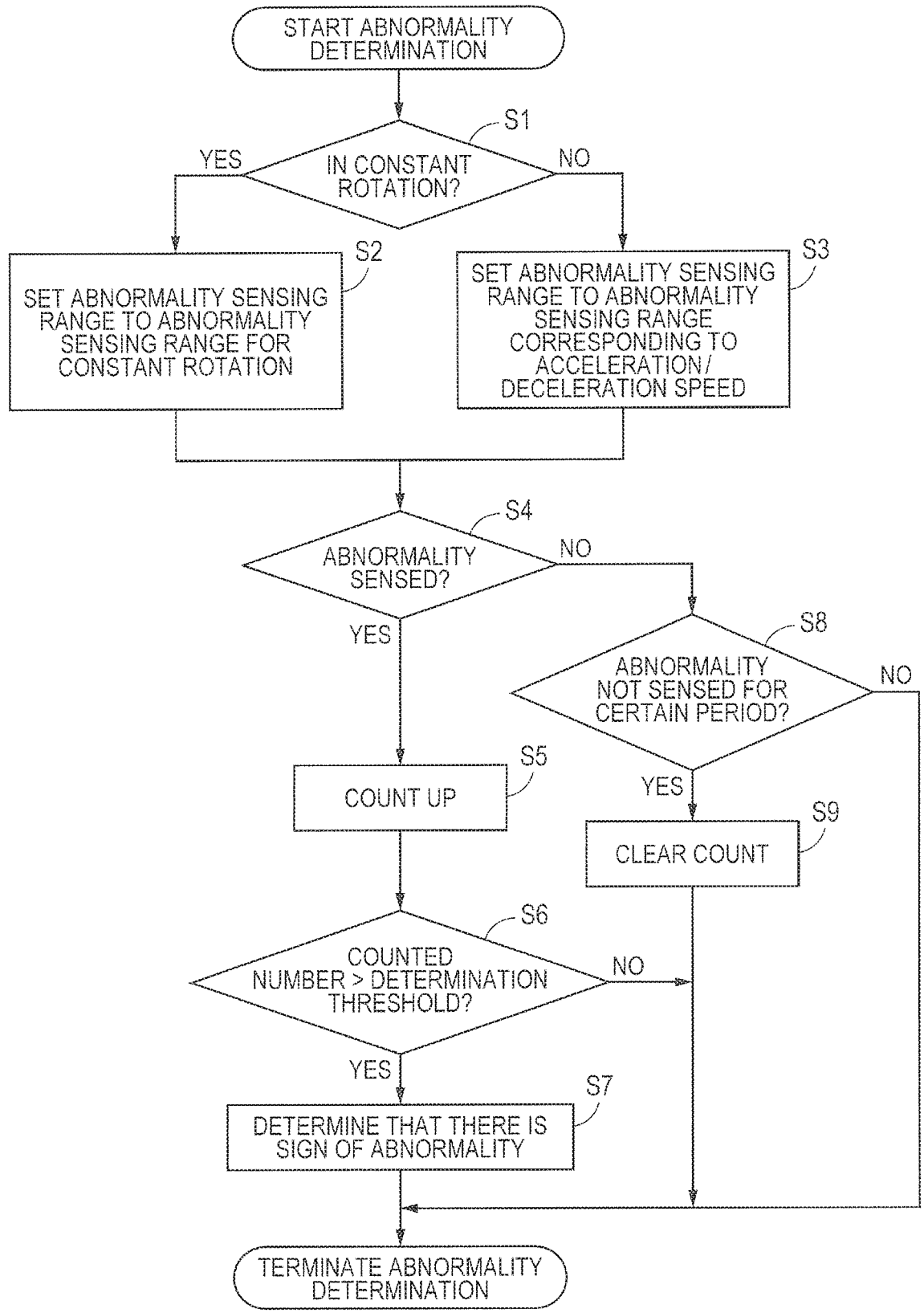
FIG. 6 is a flowchart illustrating an abnormality determination processing performed by a determination circuit of the semiconductor device according to the second embodiment.

FIG. 6 shows a flowchart illustrating an abnormality determination processing performed by the determination circuit of the semiconductor device according to the second embodiment. It is to be noted that the processing of the flowchart shown in FIG. 6 is performed every time the motor rotation angle conversion circuit 57 provides the determination circuit 58 with angular speed temporal change information. As shown in FIG. 6, when the abnormality determination processing is started, the determination circuit 58 determines whether the motor 102 is in constant rotation (Step S1). For the determination at Step S1, a control state of the motor is obtained from the arithmetic processing circuit 11. When it is determined at Step S1 that the motor 102 is in constant rotation, the determination circuit 58 sets the abnormality sensing range to the abnormality detection range for constant rotation (Step S2). When it is determined at Step S1 that the motor 102 is in acceleration/deceleration operation, the determination circuit 58 sets the abnormality sensing range to the abnormality sensing range corresponding to the acceleration/deceleration speed (Step S3).

Figure 7:
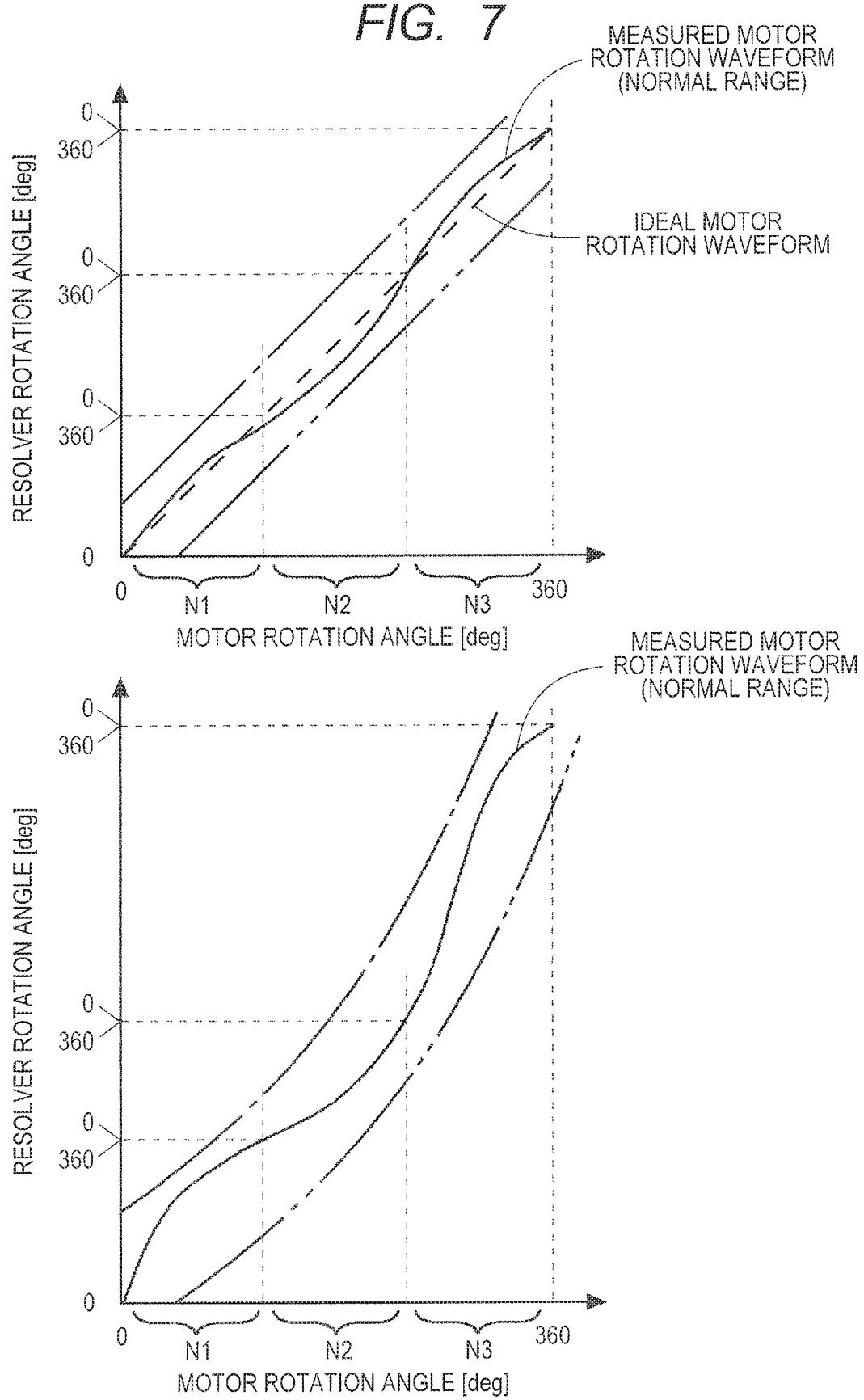
FIG. 7 is a diagram illustrating an abnormality detection range during constant rotation and an abnormality detection range during acceleration in the determination circuit of the semiconductor device according to the second embodiment.

Described here is the abnormality sensing range set by the determination circuit 58. FIG. 7 shows a diagram illustrating the abnormality detection ranges during constant rotation and during acceleration in the determination circuit of the semiconductor device according to the second embodiment. As shown in FIG. 7, when the motor 102 is in the constantly rotating state, an ideal state of change in the rotation angle of the motor and the rotation angle information for abnormality detection RDT should be linear, and so the upper limit and the lower limit of the abnormality detection range also exhibit linear change with respect to the rotation angle of the motor. On the other hand, when the motor 102 is in the accelerating state, the ideal state of the change in the rotation angle of the motor and the rotation angle information for abnormality detection RDT should be non-linear, and so the upper limit and the lower limit of the abnormality detection range also exhibit non-linear change with respect to the rotation angle of the motor.

Subsequently, the determination circuit 58 performs an abnormality sensing processing of determining whether a value indicated by the rotation angle temporal change information is within the abnormality sensing range (Step S4).

When an abnormal state is detected at Step S4 where the value indicated by the rotation angle temporal change information exceeds the abnormality sensing range, the determination circuit 58 counts up the counter by one (Step S5). Now, a method of detecting the abnormality by the determination circuit 58 is described with reference to a drawing illustrating the abnormality detecting method by the determination circuit of the semiconductor device according to the second embodiment.

Figure 8:
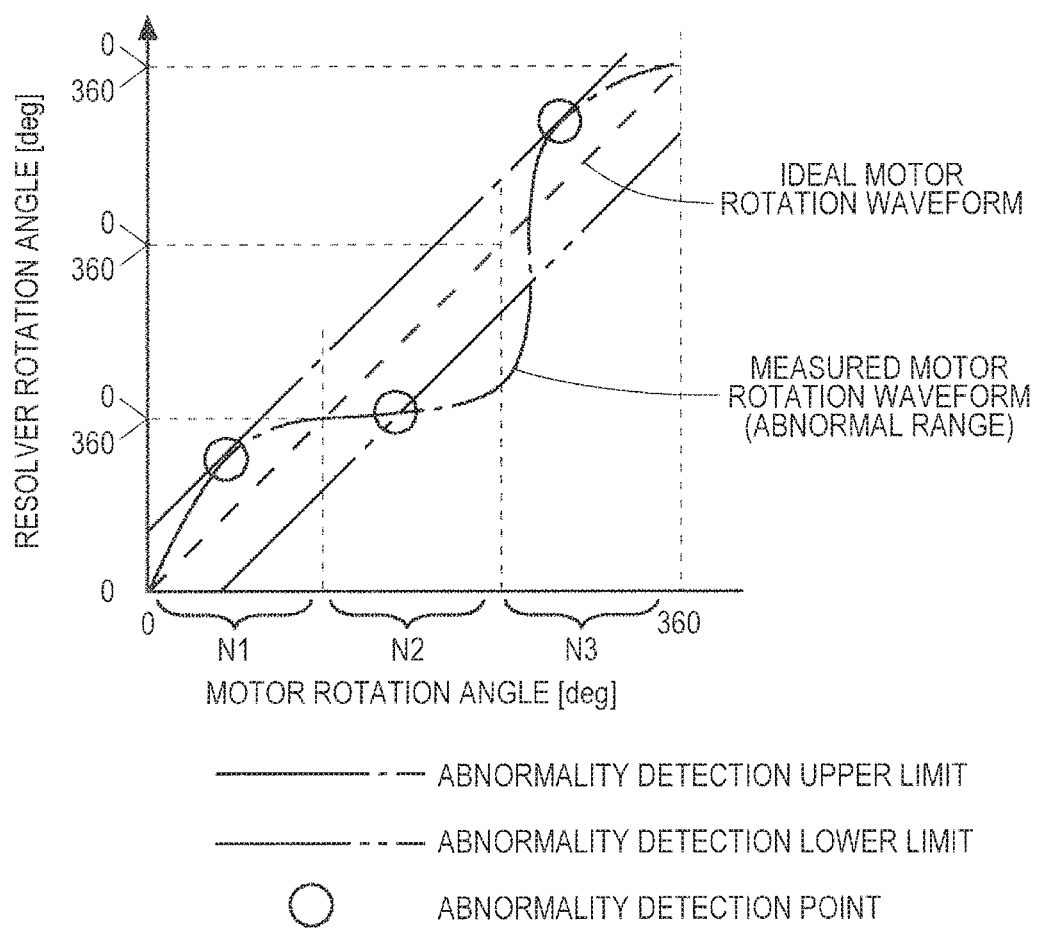
FIG. 8 is a diagram illustrating a method of detecting an abnormality with the determination circuit of the semiconductor device according to the second embodiment.

An example shown in FIG. 8 illustrates the abnormality detecting method during constant rotation. As shown in FIG. 8, the determination circuit 58 detects the abnormality in a case where the value of the rotation angle temporal change information exceeds the upper limit or the lower limit of the abnormality detection range set at Step S2, and counts the number of times of detection.

The determination circuit 58 then determines whether the counted number exceeds the preset determination threshold after the counter is counted up (Step S6). When the counted number is lower than the determination threshold at Step S6, the determination circuit 58 once terminates the abnormality determination processing and waits until the next rotation angle temporal change information is input. On the other hand, when the counted number is equal to or more than the determination threshold at Step S6, the determination circuit 58 notifies the arithmetic processing circuit 11 that there is a sign of rotation abnormality of the motor 102 (Step S7).

Moreover, when the rotation abnormality is not detected at Step S4, the determination circuit 58 determines whether there has not been any abnormality for a certain period (Step S8). When the certain period has passed since the abnormality was last detected at Step S8, the determination circuit 58 clears the value of the counter, terminates the abnormality determination processing, and waits until the next rotation angle temporal change information is input (Step S9). On the other hand, when the certain period has not passed since the abnormality was last detected at Step S8, the determination circuit 58 retains the value of the counter, terminates the abnormality determination processing, and waits until the next rotation angle temporal change information is input.

From the above description, the semiconductor device 2 according to the second embodiment can detect the rotation abnormality of the motor 102 without using the memory 16. This allows the semiconductor device 2 according to the second embodiment to reduce the circuit footprint.

Moreover, because the rotation abnormality can be detected on the basis of the rotation angle information for abnormality detection RDT for a long period regardless of capacity of the memory 16, the semiconductor device 2 according to the second embodiment can prevent erroneous detection of the rotation abnormality and achieves the abnormality detection with higher accuracy using a smaller circuit.

[Third Embodiment]

Figure 9:
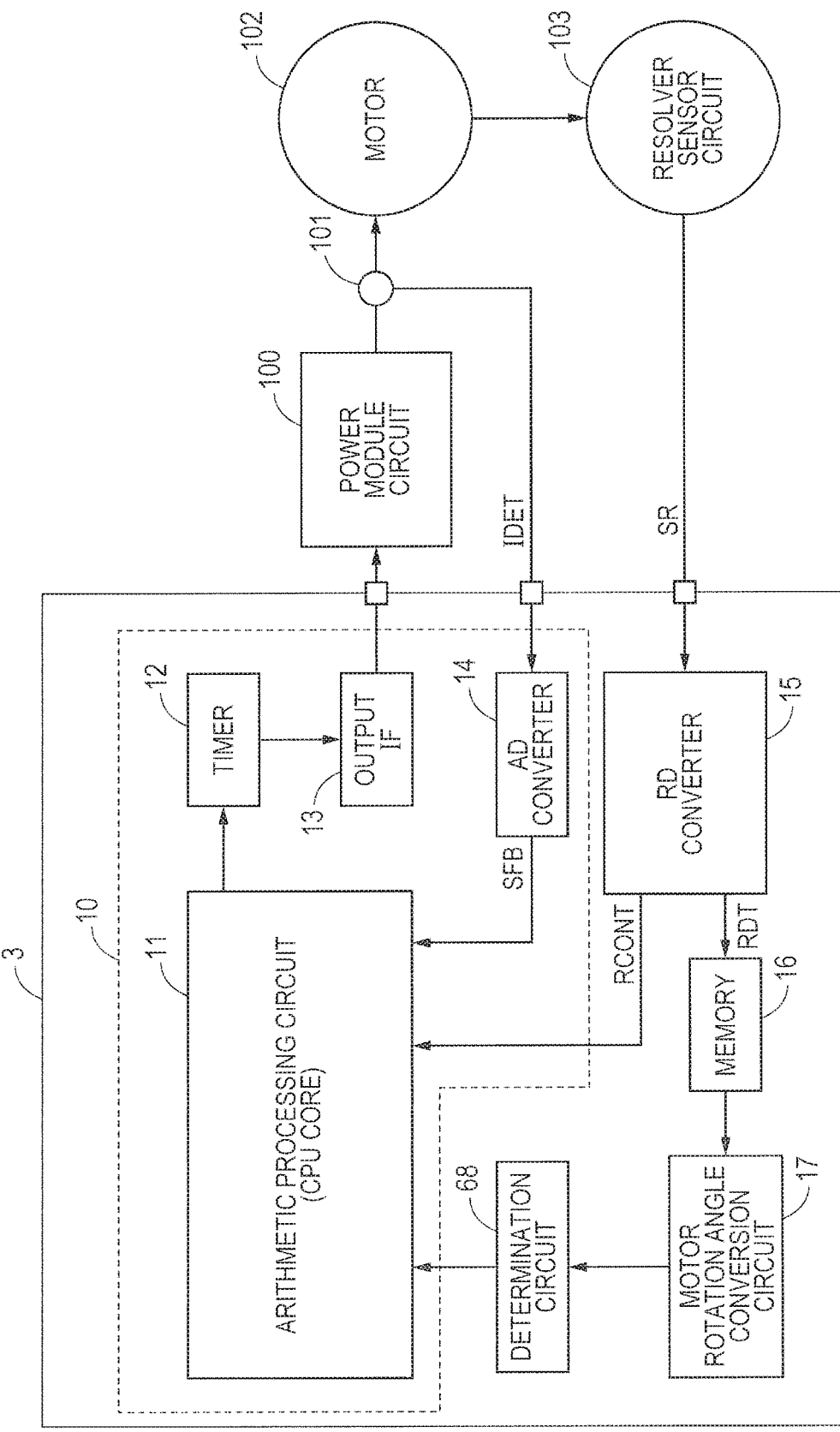
FIG. 9 is a block diagram of a semiconductor device according to a third embodiment.

In a third embodiment, a semiconductor device 3, which is another form of the semiconductor device 1 according to the first embodiment, is described. FIG. 9 shows a block diagram of the semiconductor device 3 according to the third embodiment. As shown in FIG. 9, the semiconductor device 3 according to the third embodiment is similar to the semiconductor device 1 according to the first embodiment except that the determination circuit 18 is replaced by a determination circuit 68.

Figure 10:
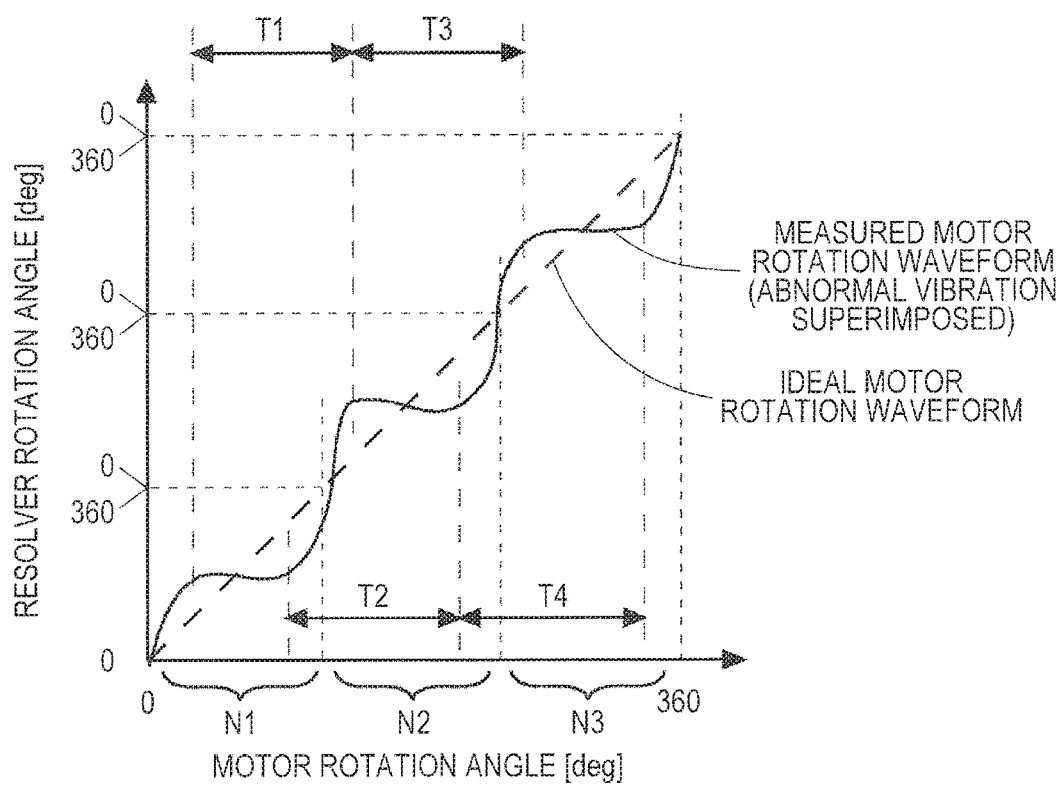
FIG. 10 is a diagram illustrating a peak generation cycle used for abnormality determination performed by the determination circuit of the semiconductor device according to the third embodiment.

The determination circuit 68 analyzes a vibration frequency of the motor 102 from an emerging cycle of a peak of the rotation angle in the rotation angle temporal change information, and determines that an abnormality occurred to the motor when the vibration frequency is different from the natural vibration frequency of the motor. The vibration frequency of the motor analyzed by the determination circuit 68 is now described with reference to FIG. 10. FIG. 10 is a diagram illustrating a peak generation cycle used for abnormality determination performed by the determination circuit of the semiconductor device according to the third embodiment.

As shown in FIG. 10, when vibration occurs to the motor 102, fluctuation is observed in the angular speed temporal change information. The determination circuit 68 then calculate cycles T1 to T4 between the peaks of the fluctuation in the angular speed temporal change information, and analyzes frequency of the fluctuation based on the cycles T1 to T4.

Figure 11:
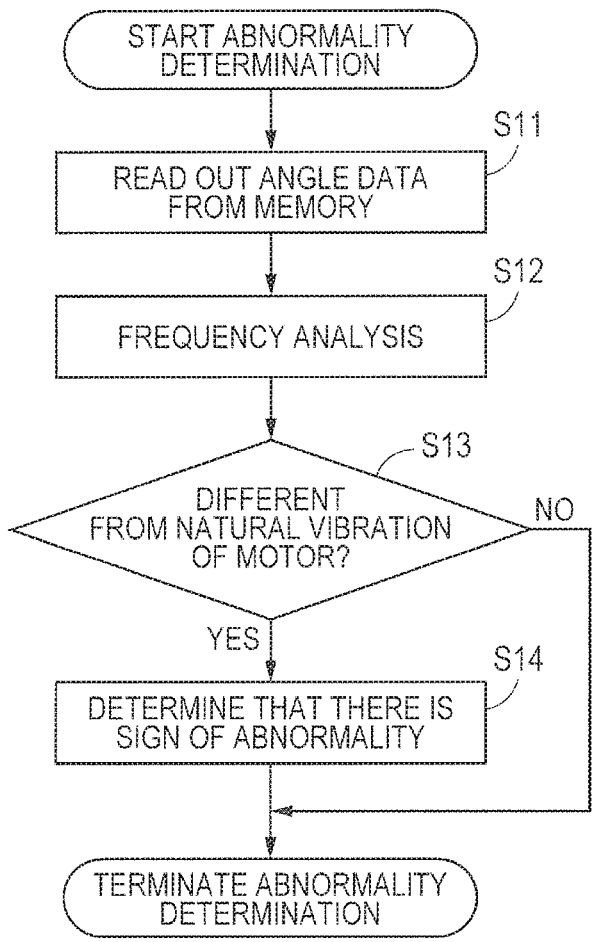
FIG. 11 is a flowchart illustrating an abnormality determination processing performed by the determination circuit of the semiconductor device according to the third embodiment.

Next, flow of the abnormality determination processing performed by the determination circuit 68 is described. For this purpose, FIG. 11 shows a flowchart illustrating the abnormality determination processing performed by the determination circuit of the semiconductor device according to the third embodiment. It is to be noted that the processing illustrated in the flowchart of FIG. 11 is performed every time the motor rotation angle conversion circuit 17 provides the determination circuit 68 with the angular speed temporal change information.

As shown in FIG. 11, the determination circuit 68 receives the rotation angle temporal change information generated by the motor rotation angle conversion circuit 17 based on the angle information for abnormality detection RDT read out from the memory 16 (Step S11). The determination circuit 68 then performs frequency analysis on the received rotation angle temporal change information (Step S12). When the result of the frequency analysis at Step S12 indicates that the fluctuation in the angular speed temporal change information is different from the frequency of the natural vibration of the motor, the determination circuit 68 notifies the arithmetic processing circuit 11 that there is a sign of abnormality (Steps S13, S14). On the other hand, when the result of the frequency analysis at Step S12 indicates that the fluctuation in the angular speed temporal change information is identical to the frequency of the natural vibration of the motor, the determination circuit 68 once terminates the abnormality determination processing and waits until the next rotation angle temporal change information is input.

From the above description, the semiconductor device 3 according to the third embodiment determines what information about natural vibration of the motor 102 from among the information about the motor 102 obtained from the rotation angle information for abnormality detection RDT as normal. This can reduce erroneous determination about the natural vibration of the motor 102 with the semiconductor device 3 according to the third embodiment.

[Fourth Embodiment]

Figure 12:
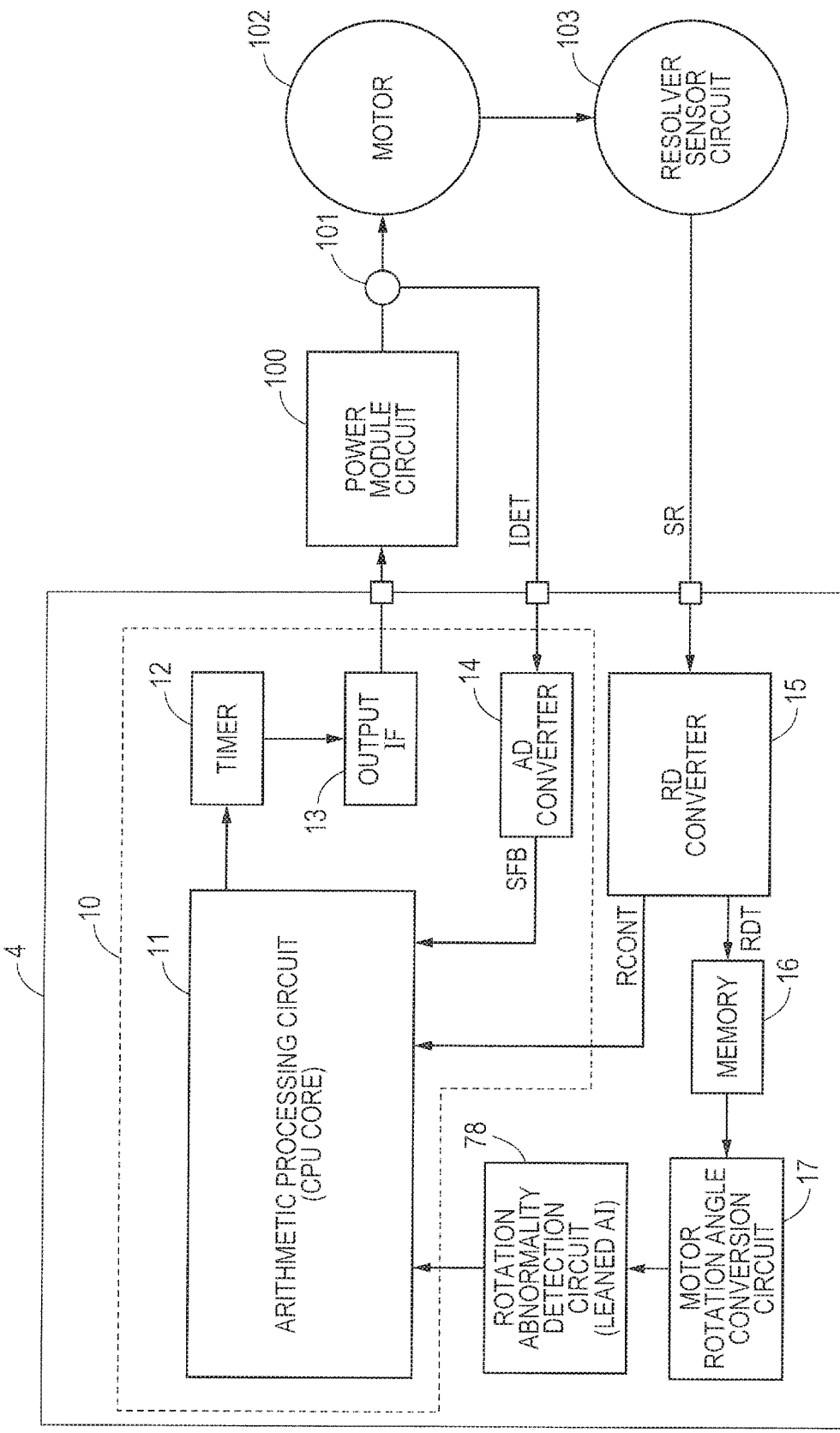
FIG. 12 is a block diagram of a semiconductor device according to a fourth embodiment.

In a fourth embodiment, a semiconductor device 4, which is another form of the semiconductor device 1 according to the first embodiment, is described. Now, FIG. 12 shows a block diagram of the semiconductor device 4 according to the fourth embodiment. As shown in FIG. 12, in the semiconductor device 4 according to the fourth embodiment, the determination circuit 18 is replaced by a determination circuit 78.

The determination circuit 78 is an artificial intelligence having learned the normal state and the abnormal state of rotation and vibration of the motor in advance, and notifies the motor drive control circuit 10 of the motor state according to the result obtained by inputting the rotation angle temporal change information to the artificial intelligence.

A learning method for the artificial intelligence may be based on unsupervised learning by performing data prediction on input data (inference algorithm), supervised learning by determining whether the input data derives from a normal behavior or an abnormal behavior based on feature classification, and the like.

By using the determination circuit 78, the semiconductor device 4 according to the fourth embodiment can detect rotation abnormality of the motor 102 regardless of the threshold or the abnormality determination range. Moreover, the semiconductor device 4 according to the fourth embodiment makes it possible to detect a sign of abnormality based on the currently obtained data by using the inference algorithm.

Although the invention was specifically described using the embodiments, it is needless to say that the invention is not limited to the above-described embodiments but various changes can be made without departing from the scope of the invention.

(Supplementary Note 1)

A semiconductor device including:
 a motor drive control circuit that generates drive waveform signal indicative of a waveform of a drive signal that drives a motor;
 a resolver rotation angle conversion circuit that obtains a rotation angle signal indicative of a rotation angle of the motor from a resolver that measures the rotation angle of the motor and generates rotation angle information by converting the rotation angle signal to a digital value;
 a motor rotation angle conversion circuit that generates rotation angle temporal change information by converting the rotation angle information with respect to each phase of the motor to an angular change of the motor; and
 a determination circuit that determines that an abnormality occurs in the motor in a case where the rotation angle temporal change in the rotation angle temporal change information exceeds an abnormality detection range.

(Supplementary Note 2)

The semiconductor device according to Supplementary Note 1, in which the resolver rotation angle conversion circuit includes:
 a first tracking loop circuit that generates rotation angle information for control using a first filter coefficient having low trackability to the rotation angle signal obtained and outputs the rotation angle information for control to the motor drive control circuit; and
 a second tracking loop circuit that generates rotation angle information for abnormality detection using a second filter coefficient having high trackability to the rotation angle information obtained and outputs the rotation angle information for abnormality detection to the motor rotation angle conversion circuit.

(Supplementary Note 3)

The semiconductor device according to Supplementary Note 1, in which the motor rotation angle conversion circuit generates the rotation angle temporal change information by converting the rotation angle with respect to each phase of the motor to an angular change of the motor for one revolution.

(Supplementary Note 4)

The semiconductor device according to Supplementary Note 1, further including a memory arranged between the resolver rotation angle conversion circuit and the motor rotation angle conversion circuit, in which the resolver rotation angle conversion circuit stores the rotation angle information in the memory and the motor rotation angle conversion circuit reads out the rotation angle information from the memory.

(Supplementary Note 5)

The semiconductor device according to Supplementary Note 1, in which the determination circuit changes the abnormality detection range according to rotating speed of the motor when the motor is in an acceleration/deceleration state.

(Supplementary Note 6)

The semiconductor device according to Supplementary Note 1, in which the determination circuit determines that an abnormality occurred to the motor when a number of times that a value of the rotation angle temporal change information exceeds the abnormality detection range exceeds a predetermined number of times within a certain period.

(Supplementary Note 7)

The semiconductor device according to Supplementary Note 1, in which the determination circuit analyzes vibration frequency of the motor from an emerging cycle a peak of the rotation angle in the rotation angle temporal change information, and determines that an abnormality occurred to the motor when the vibration frequency is different from that of a natural vibration of the motor.

(Supplementary Note 8)

The semiconductor device according to Supplementary Note 1, in which the determination circuit is an artificial intelligence having learned a normal state and an abnormal state of rotation and vibration of the motor in advance, and notifies motor drive control circuit of the motor state according to the result obtained by inputting the rotation angle temporal change information to the artificial intelligence.

(Supplementary Note 9)

The semiconductor device according to Supplementary Note 1, in which the resolver rotation angle conversion circuit is formed over a semiconductor chip different from the motor drive control circuit.

What is claimed is:

1. A semiconductor device comprising:
 a resolver rotation angle conversion circuit including:
  a first tracking loop circuit that generates first rotation angle information for performing a control using a first proportional and integral processing to a rotation angle signal indicative of a rotation angle of a motor outputted by a resolver; and
  a second tracking loop circuit that generates second rotation angle information for performing an abnormality detection using a second proportional and integral processing to the rotation angle signal, a gain of the second proportional and integral processing being higher than a gain of the first proportional and integral processing;
 a motor rotation angle conversion circuit that generates rotation angle temporal change information by converting the second rotation angle information with respect to each phase of the motor to an angular change of the motor for one revolution; and
 a determination circuit that determines a vibration frequency of the motor using a peak cycle of the rotation angle temporal change information, and determines that an abnormality occurred to the motor when the vibration frequency of the motor is different from a natural vibration frequency of the motor.

2. The semiconductor device according to claim 1, further comprising a memory arranged between the resolver rotation angle conversion circuit and the motor rotation angle conversion circuit, wherein the resolver rotation angle conversion circuit stores the second rotation angle information in the memory and the motor rotation angle conversion circuit reads out the second rotation angle information from the memory.

3. The semiconductor device according to claim 1, wherein the resolver rotation angle conversion circuit is formed over the same semiconductor chip as a motor drive control circuit.

4. A method of detecting abnormal rotation of a motor by performing an arithmetic processing on information obtained from a resolver that measures rotation angle of the motor using an arithmetic unit, the method comprising the steps of:

generating first rotation angle information for performing a control using a first proportional and integral processing to the information from the resolver;

generating second rotation angle information for performing an abnormality detection using a second proportional and integral processing to the information from the resolver, a gain of the second proportional and integral processing being higher than a gain of the first proportional and integral processing;

generating rotation angle temporal change information by converting the second rotation angle information with respect to each phase of the motor to an angular change of the motor for one revolution, and determining a vibration frequency of the motor using a peak cycle of the rotation angle temporal change information; and determining that an abnormality occurred to the motor when the vibration frequency of the motor is different from a natural vibration frequency of the motor.

* * * * *